(No Model.)
F. A. WEGNER.
THILL COUPLING.
No. 433,502. Patented Aug. 5, 1890.
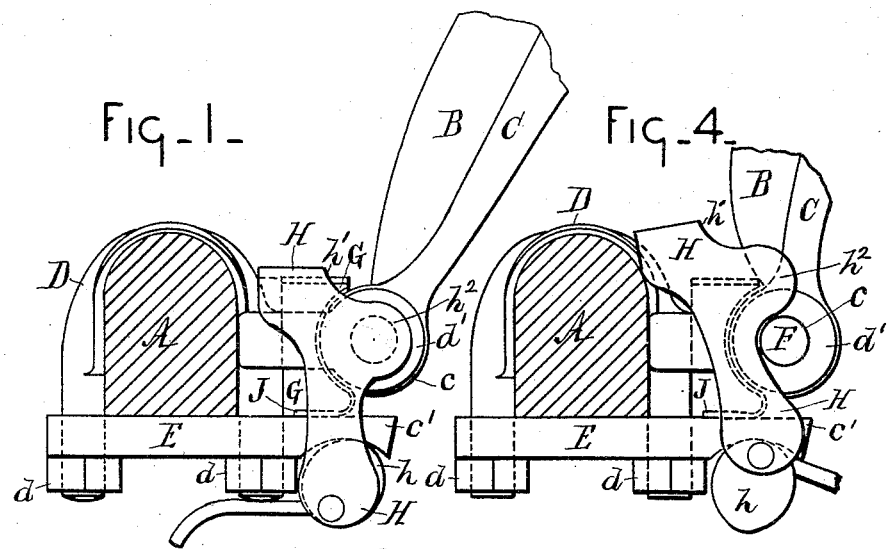
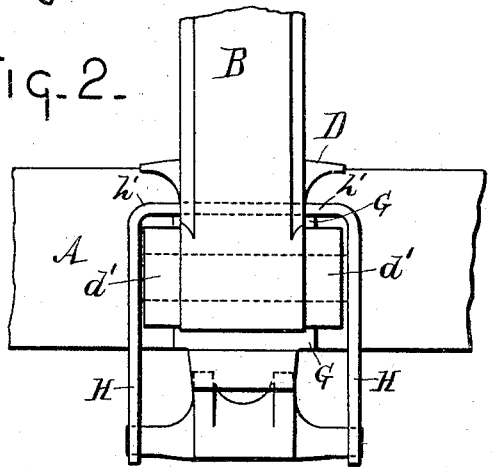
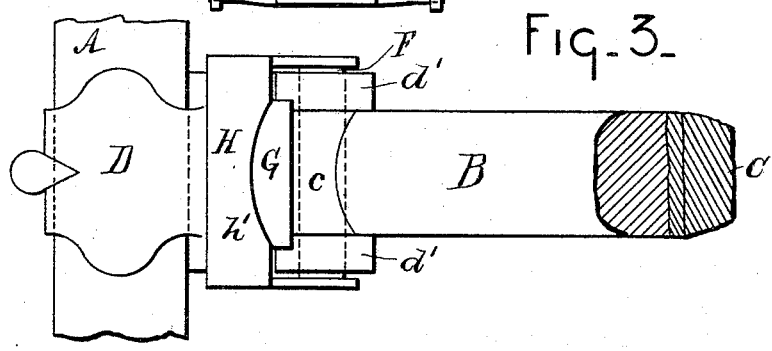
WITNESSES
C. J. Shipley
F. Clough
INVENTOR
Frederick A. Wegner
By Nelle N. Leggett & Co.
Attorneys.

UNITED STATES PATENT OFFICE.

FREDERICK A. WEGNER, OF THREE RIVERS, MICHIGAN.

THILL-COUPLING.

SPECIFICATION forming part of Letters Patent No. 433,502, dated August 5, 1890.

Application filed November 26, 1889. Serial No. 331,637. (No model.)

*To all whom it may concern:*

Be it known that I, FREDERICK A. WEGNER, a citizen of the United States, residing at Three Rivers, county of St. Joseph, State of Michigan, have invented a certain new and useful Improvement in Thill-Couplers; and I declare the following to be a full, clear, and exact description of the same, such as will enable others skilled in the art to which it pertains to make and use the same, reference being had to the accompanying drawings, which form a part of this specification.

My invention is designed to produce a thill-coupler for buggies, wagons, and other vehicles in which the parts shall be so constructed as to be simple in operation and not liable to get out of order, and yet in which the engagement between the thill and the axle shall be positive and noiseless.

In the drawings, Figure 1 is a side elevation of my coupler with the axle in section and the thill broken off a short distance from the coupling. Fig. 2 is a front elevation. Fig. 3 is a plan view. Fig. 4 is a side elevation with the clip raised to permit the removal of the coupling-pin.

In carrying out my invention, A represents the axle, and B the thill.

C is the usual strap-iron on the end of the thill, provided on its end with an eye $c$, through which the bolt is passed in attaching it to the axle.

D is the usual clip embracing the axle, the free ends projecting below the axle and through the plate E, where they are secured by the nuts $d$. On the front of the clip are the usual lugs or ears $d'$, between which the eye $c$ is inserted and through which the bolt is passed in securing the thill.

F is the pin by which the thill is attached, and G the usual rubber block placed between the eye and the clip to tighten the parts and render them noiseless.

I will now describe my improvement. Instead of the usual bolt having a head on one end and nut on the other, I make the pin only long enough to properly key the eye $c$ between the lugs. I also extend the plate E out underneath the rubber block, as shown at $c'$, and provide it with a concave surface on its under side. I then provide what may be termed a "clip" H, having on its lower end the eccentric $h$. When placed on the coupler, the upper end $h'$ will bear upon the upper surface of the rubber block, while the eccentric will be adjacent to the concave surface of the plate E. When the eccentric is thrown up so as to bear upon the plate, as shown in Fig. 1, the rubber block will be compressed by the clip H, and will thus bear tightly against the eye $c$ on the thill and hold it so as to prevent any rattling or noise of any kind. The clip is also provided on its sides with the projections $h^2$, which stand out and cover the ends of the bolt F, so that when the clip is in position with the eccentric thrown up the bolt is prevented from slipping out of place and thus disconnecting the thill, and the rubber is compressed, so as to render the engagement noiseless. Should the rubber become worn, or should it for any reason not be compressed sufficiently to prevent rattling, one or more lining-pieces may be employed, thus causing the clip H to bear harder on the rubber block G and compress it sufficiently.

To uncouple the shaft, the operator has simply to throw down the eccentric, and thus loosen the clip and raise it so that the projections $h^2$ will be above the bolt, as shown in Fig. 4. He can then readily remove the bolt, and thus uncouple the thill. By this arrangement of the parts there is no nut to become unscrewed and thus allow the bolt to slip out, as is so generally the case nowadays. The engagement of the thill with the axle is made absolutely noiseless, since the clip H entirely surrounds or embraces the coupling, and the thill can be connected or disconnected from the axle in a much shorter time than by the old method.

If desired, the wearing-plate J may be provided, so that the movement of the thill will not operate to wear the rubber block.

What I claim is—

1. In a thill-coupler, the combination, with the axle and the thill having on its ends a coupling-eye, of the axle-clip D, having lugs to receive the thill-eye, the pin F, passed through said eye and lugs, and the vertically and rearwardly movable clip H, having the eccentric $h$ and the side projections $h^2\,h^2$, substantially as shown and described.

2. In a thill-coupler, the combination, with the axle, the thill having a coupling-eye, the axle-clip having lugs to receive said eye, and a pin passed through said lugs and eye, of the rubber block G, located between the axle-clip and coupling-eye, and the upwardly and rearwardly removable clip H, provided with the eccentric $h$ and the side projections $h^2 h^2$, substantially as shown and described.

3. In a thill-coupling, the combination, with the axle and the thill having a coupling-eye, of the axle-clip D, having lugs $d'\ d'$ to receive said eye, the plate E, having a forward extension $c'$, the pin F, the vertically and rearwardly movable clip H, having eccentric $h$ and side projectionss $h^2 h^2$, and the rubber block G, substantially as shown and described.

In testimony whereof I sign this specification in the presence of two witnesses.

FREDERICK A. WEGNER.

Witnesses:
W. H. CHAMBERLIN,
MARION A. REEVE.